US009134134B2

(12) United States Patent
Wang et al.

(10) Patent No.: US 9,134,134 B2
(45) Date of Patent: Sep. 15, 2015

(54) METHOD AND APPARATUS FOR ESTIMATING AND DISPLAYING DESTINATION AND RECORDING MEDIUM USING THE SAME

(71) Applicant: HTC Corporation, Taoyuan County (TW)

(72) Inventors: John C. Wang, Taoyuan County (TW); Chi-Chen Cheng, Taoyuan County (TW); Peter Chin, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 60 days.

(21) Appl. No.: 13/762,386

(22) Filed: Feb. 8, 2013

(65) Prior Publication Data

US 2013/0218452 A1 Aug. 22, 2013

Related U.S. Application Data

(60) Provisional application No. 61/599,427, filed on Feb. 16, 2012.

(51) Int. Cl.
*G01C 21/00* (2006.01)
*G08G 1/123* (2006.01)
*G01C 21/34* (2006.01)
*G01C 21/36* (2006.01)

(52) U.S. Cl.
CPC ............ *G01C 21/34* (2013.01); *G01C 21/3492* (2013.01); *G01C 21/367* (2013.01); *G01C 21/3617* (2013.01); *G01C 21/3694* (2013.01)

(58) Field of Classification Search
CPC ..... H04N 5/781; H04N 7/0122; H04N 5/232; H04N 7/183; H04W 4/021; G01C 21/34; G01C 21/3617; G01C 21/367; G01C 21/3492; G01C 21/3694; G01S 5/02
USPC ........................... 701/400–541; 340/988–996
See application file for complete search history.

(56) References Cited

U.S. PATENT DOCUMENTS

| | | | |
|---|---|---|---|
| 2004/0128066 A1 | 7/2004 | Kudo et al. | |
| 2007/0010942 A1 | 1/2007 | Bill | |
| 2007/0069135 A1* | 3/2007 | Kraft | 250/339.12 |

(Continued)

FOREIGN PATENT DOCUMENTS

| | | |
|---|---|---|
| CN | 1539075 | 10/2004 |
| CN | 1892182 | 1/2007 |

(Continued)

OTHER PUBLICATIONS

"Search Report of Europe Counterpart Application", issued on Jun. 3, 2013, p. 1-p. 3.

(Continued)

*Primary Examiner* — Muhammad Shafi
(74) *Attorney, Agent, or Firm* — Jianq Chyun IP Office

(57) ABSTRACT

A method, an apparatus, and a recording medium for estimating and displaying a destination are provided. In the method, a plurality of places frequently visited by a user is set first. Then, a current location of the electronic apparatus is continuously detected by using a positioning module, and a distance between the current location and each of the places is calculated. Whether the distance between the current location and each of the places increases is determined. When the distance increases, the corresponding place is removed and the remaining places are displayed.

17 Claims, 5 Drawing Sheets

(56) References Cited

U.S. PATENT DOCUMENTS

| | | | |
|---|---|---|---|
| 2008/0243375 A1* | 10/2008 | Han | 701/208 |
| 2009/0005978 A1* | 1/2009 | Forstall et al. | 701/210 |
| 2009/0018766 A1* | 1/2009 | Chen et al. | 701/202 |
| 2009/0051785 A1* | 2/2009 | Kamada et al. | 348/231.5 |
| 2011/0238289 A1 | 9/2011 | Lehmann et al. | |

FOREIGN PATENT DOCUMENTS

| | | | |
|---|---|---|---|
| CN | 102235865 | | 11/2011 |
| CN | 102667403 | | 9/2012 |
| DE | 19909385 | * | 9/2000 |
| TW | 201030313 | | 8/2010 |
| TW | 201042239 | | 12/2010 |
| WO | 2010040385 | | 4/2010 |

OTHER PUBLICATIONS

"Office Action of Taiwan Counterpart Application", issued on Sep. 2, 2014, p. 1-p. 8.

"Office Action of China Counterpart Application," issued on Apr. 27, 2015, pp. 1-7.

"Office Action of China Counterpart Application," issued on Jul. 16, 2015, pp. 1-5.

* cited by examiner

METHOD AND APPARATUS FOR ESTIMATING AND DISPLAYING DESTINATION AND RECORDING MEDIUM USING THE SAME

CROSS-REFERENCE TO RELATED APPLICATION

This application claims the priority benefit of U.S. provisional application Ser. No. 61/599,427, filed on Feb. 16, 2012. The entirety of the above-mentioned patent application is hereby incorporated by reference herein and made a part of this specification.

BACKGROUND

With the continuous advancement and improvement of electronic technology and communication techniques, compact or portable electronic devices such as smart phones, tabular computer are also evolving rapidly. Those electronic devices in the current market are integrated with multiple functions so as to enhance their competence. Besides functions of photograph, telephone communication and internet surfing, currently, Global Positioning System (GPS) and electronic map are integrated in the portable apparatus, such that a user can know the location of himself anytime and anywhere through the positioning function provided by the portable apparatus.

Although the positioning function of current portable apparatus can display a current location of a user, the situations occurred most in actual usage are that the user may leave for multiple places and even go there and back among those places. For example, the user may leave for a work place from his home, then go to a fitness center or a supermarket, and finally come back home. Meanwhile, the user usually has to search for and reset the place to be leave for, so as to find the corresponding route. Beside, since a traffic jam may happen in the route, the way to fast reach the destination is not easily estimated.

SUMMARY

Accordingly, the application provides a method, an electronic apparatus, and a recording medium for estimating and displaying a destination, through which the destination where the user intends to go can be estimated, and real-time traffic information about the route to the destination can be provided, so as to assist the user in fast reaching the destination.

The application provides a method for estimating and displaying a destination, adapted for an electronic apparatus to estimate the destination the user intends to leave for. In the method, a plurality of first places frequently visited by a user are set. Then, a current location of the electronic apparatus is continuously detected by a positioning module. A distance between the current location and each of the first places is calculated and determined whether being increased. When the distance increases, a scale of an electronic map is adjusted so as to remove the corresponding first places and display the remaining first places.

In one example of the application, in the step of determining whether the distance between the current location and each of the first places increases, it is determined whether the distance between the current location and each of the first places increases within a preset period of time, and the scale of the electronic map is adjusted to remove corresponding first places when the distance increases within the preset period of time.

In one example of the application, in the step of setting the first places frequently visited by the user, a history of positioning executed by the electronic apparatus is first retrieved, a plurality of second places appeared in the history are searched, and an appearance number of times of each of the second places is accumulated, so as to set the second places having the appearance number of times sorted ahead as the first places frequently visited by the user.

In one example of the application, in the step of setting the first places frequently visited by the user, a calendar stored in the electronic apparatus is first accessed, a plurality of third places appeared in the events recorded in the calendar are searched, and an appearance number of times of each of the third places is accumulated, so as to set the third places having the appearance number of times sorted ahead as the first places frequently visited by the user.

In one example of the application, in the step of determining whether the distance between the current location and each of the first places increases, an increment in the distance between the current location and each of the first places is determined whether to be over a threshold. When the increment is over the threshold, the scale of the electronic map is adjusted to remove the corresponding first places.

In one example of the application, the aforesaid method further calculates a moving speed of the electronic apparatus, estimates a time required to travel from the current location to each of the first places according to the moving speed, and displays the distance between the current location and each of the first places and the time required to leaver for each of the first places.

In one example of the application, the aforesaid method further adjust the scale of the electronic map to adapt a display range of the electronic map to a minimum range covering the current location and the destination.

In one example of the application, the aforesaid method further retrieves real-time traffic information of a plurality of roads passed by in traveling from the current location to each of the first places, and accordingly marks traffic condition on the roads in the electronic map.

The application provides an apparatus for estimating and displaying a destination, adapted to estimating the destination the user intends to leave for. The apparatus comprises a setting module, a calculation module, a determination module, and an estimation module. The setting module is used to set a plurality of first places frequently visited by a user. The calculation module continuously detects a current location of the electronic apparatus by using a positioning module, and calculates a distance between the current location and each of the first places. The determination module determines whether the distance between the current location and each of the first places increases. When the distance is increased, the estimation module adjusts a scale of the electronic map to remove corresponding first places, and displays each of remaining first places as the estimated destination.

In one example of the application, the determination module determines whether the distance between the current location and each of the first places increases within a preset time.

In one example of the application, the aforesaid apparatus further comprises a history recording module, which is configured to record a history of positioning executed by the electronic apparatus, such that the setting module searches for a plurality of second places appeared in the history, and accumulates an appearance number of times of each of the second places, so as to set the second places having the appearance number of times sorted ahead as the first places frequently visited by the user.

In one example of the application, the aforesaid apparatus further comprises a calendar module, which is configured to store a calendar, such that the setting module searches for a plurality of third places appeared in a plurality of events recorded in the calendar, and sets the same as the first places frequently visited by the user.

In one example of the application, the aforesaid apparatus further comprises an input module, which is configured to receive at least one fourth place manually input by a user, such that the setting module sets the at least one fourth place as the first places frequently visited by the user.

In one example of the application, the determination module determines whether an increment of the distance between the current location and each of the first places is over a threshold, and accordingly the estimation module removes corresponding first places when the increment is over the threshold.

In one example of the application, the aforesaid calculation module calculates a moving speed of the electronic apparatus, estimates a time required to travel from the current location to each of the first places according to the moving speed, and accordingly the estimation module further displays the distance between the current location and each of the first places and the time required to leaver for each of the first places.

In one example of the application, the estimation module further adjusts the scale of the electronic map to adapt a display range of the electronic map to a minimum range covering the current location and the destination.

In one example of the application, the aforesaid apparatus further comprises a traffic information retrieving module, which is configured to retrieve real-time traffic information of a plurality of roads passed by in traveling from the current location to each of the first places, and accordingly mark traffic condition on the roads in the electronic map.

In one example of the application, when only one first place is left after removal, the estimation module confirms the first place as the destination, and accordingly plans and displays a route from the current location to the destination.

The application provides a recording medium, used for storing a computer program, which comprises a plurality of program codes for being loaded into an electronic apparatus to enable the electronic apparatus to execute a method for estimate and display a destination. The method comprises following steps. First, a plurality of places frequently visited by a user are set. Then, a current location of the electronic apparatus is continuously detected by a positioning module. A distance between the current location and each of the places is calculated and determined whether being increased. When the distance is increased, a scale of an electronic map is adjusted so as to remove corresponding places and display remaining places.

Based on the above, in the method, the apparatus, and the recording medium for estimate and display the destination, the distance between a current location of the electronic apparatus and each of a plurality of places is continuously detected, so as to estimate the destination the user intends to leave for. Besides, the application visualizes the procedure of the destination estimation by combining the electronic map and the real-time traffic information, and provides a better route for the user according to the real-time traffic condition, so as to improve the usage experience of the user.

To make the above features and advantages of the application more comprehensible, several examples accompanied with drawings are described in detail as follows.

DESCRIPTION OF EXAMPLES

Figure 1:
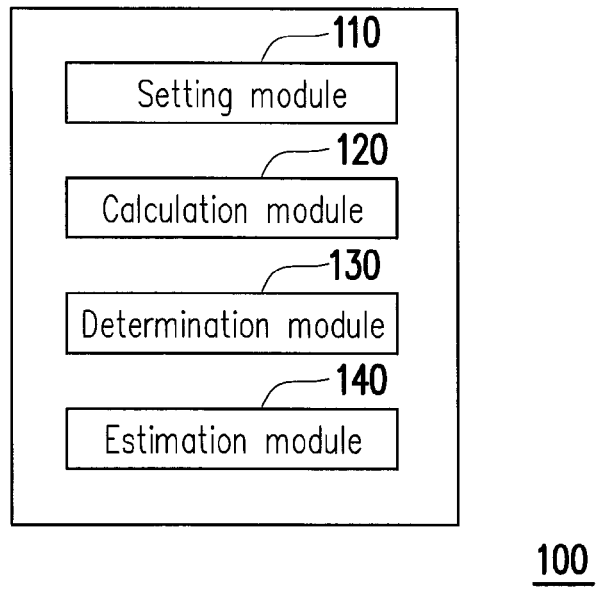
FIG. 1 is a block diagram of a destination estimating and display apparatus according to one example of the application.

FIG. 1 is a block diagram of a destination estimating and display apparatus according to one example of the application. Referring to FIG. 1, the destination estimating and display apparatus 100 comprises a setting module 110, a calculation module 120, a determination module 130, and an estimation module 140. Those modules are, for example, hardware apparatuses consisted of logic circuit elements and are able to execute a function of estimating and displaying a destination. The modules may also be software or firmware stored in a hard disk or a memory of the electronic apparatus and is used to execute a function of estimating and displaying a destination. The apparatus 100 may be installed or disposed in an electronic apparatus such as a cell phone, a smart phone, a personal digital assistant (PDA), a PDA phone, a tablet PC, or a car PC, and is used for estimating the destination of the user of the electronic apparatus intends to leave for.

Figure 2:
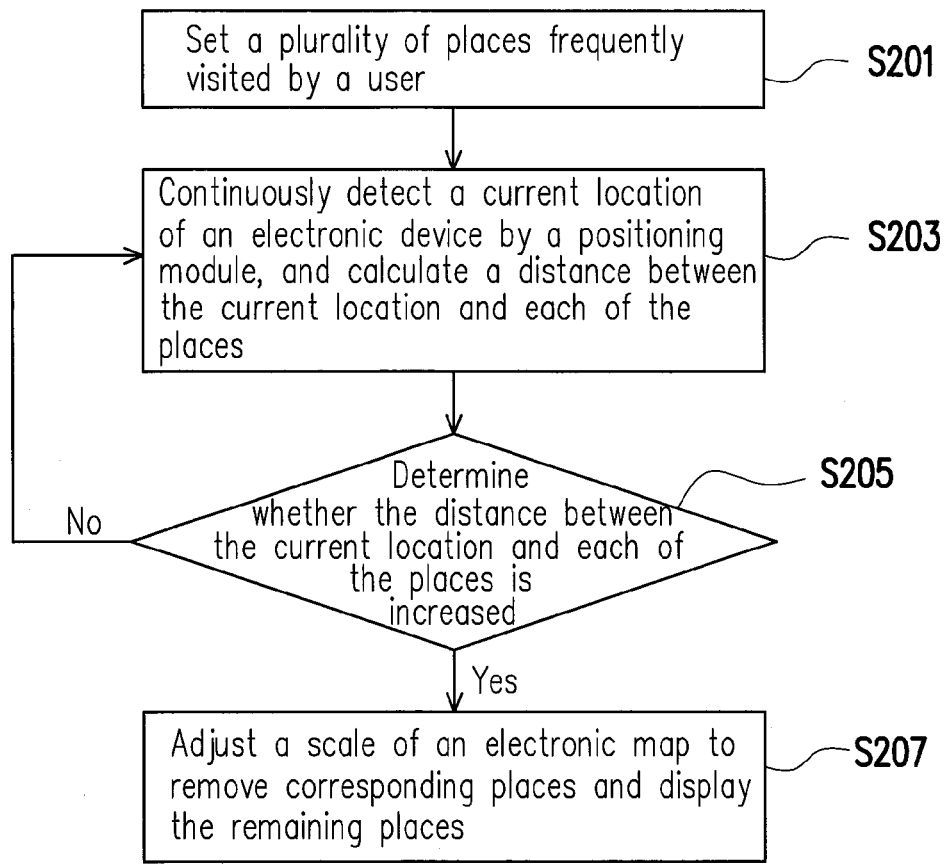
FIG. 2 is a flowchart illustrating a method for estimating and displaying a destination according to one example of the application.

FIG. 2 is a flowchart illustrating a method for estimating and displaying a destination according to one example of the application. Referring to FIG. 2, the method of the present example is adapted to the aforesaid apparatus 100 and a detailed flow of the method for estimating and displaying the destination of the present example is described accompanied with each element in the apparatus 100.

First, the setting module 110 sets a plurality of places frequently visited by a user (step S201). In detail, when the user activates the apparatus 100, the places frequently visited by the user such as user's home, work place, school, fitness center, or supermarket may be set as the frequently visited places by the setting module 110.

Then, the calculation module 120 continuously detects a current location of the electronic apparatus by using a positioning module (not shown), and calculates a distance between the current location and each of the places (step S203). The positioning module may be a global positioning system (GPS), which can process satellite positioning signals so as to obtain longitude and latitude coordinates of the current location, or a positioning system that calculates the current location by using base stations or wireless network hotspots, which is not limited herein. The calculation module 120 may calculate the distance between the current location and each of the places by using the longitude and latitude coordinates thereof.

Then, the positioning module continuously detects the current location of the electronic apparatus, the calculation module 120 continuously calculates the distance between the current location and each of the places, and the determination module 130 determines whether the distance between the current location and each of the places increases, for example, determines whether the distance is increased within a preset time (step S205). When the distance is not increased within the preset time, the flow returns to step S203 for continuous detection. When the distance is increased within the preset time, the estimation module 140 adjusts a scale of the electronic map to remove the corresponding places, and displays each of the remaining places as the estimated destination.

For example, if the calculation module 120 calculates a distance between the current location and one of the places (for example, place A) is d1 and sets the preset time as 3 minutes. After the 3 minutes, if the calculation module 120 calculates the distance between the current location and the place A is over d1, it represents that the electronic apparatus gradually moves away from the place A. In other words, the possibility that the electronic apparatus returns back to the place A is relatively low, and therefore the estimation module 140 can remove the place A. The rest places may be deduced by analogy to be determined whether to be removed. Finally, the electronic apparatus displays the remaining places as the estimated destinations for the user to reference.

Through aforesaid destination estimating and display method, the electronic apparatus is able to obtain the destination that the user intends to go without additional operations performed by the user. In another example, the application further provides a plurality of method for setting the places frequently visited by the user, and combining the electronic map, real-time traffic information, and navigation system, so as to improve usage experience.

Figure 3:
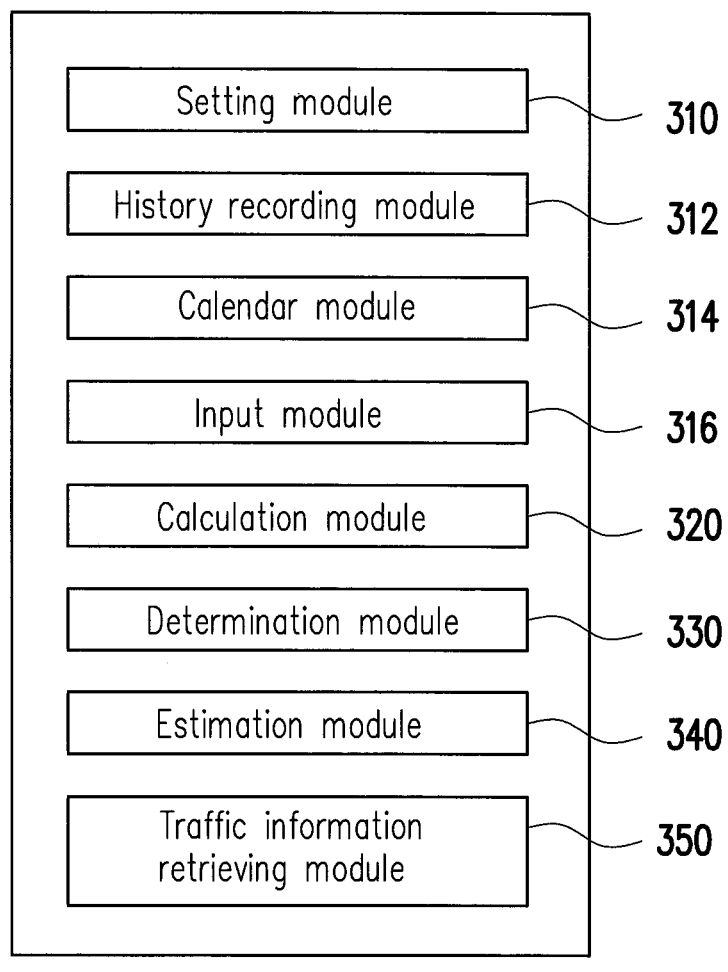
FIG. 3 is a block diagram of a destination estimating and display apparatus according to one example of the application.

FIG. 3 is a block diagram of a destination estimating and display apparatus according to one example of the application. Referring to FIG. 3, the destination estimating and display apparatus 300 comprises a setting module 310, a history recording module 312, a calendar module 314, an input module 316, a calculation module 320, a determination module 330, an estimation module 340, and a traffic information retrieving module 350. In the present example, functions of the setting module 310, the calculation module 320, the determination module 330, and the estimation module 340 is the same as or similar to those of setting module 110, the calculation module 120, the determination module 130, and the estimation module 140 in the previous example, which are not repeated herein.

The differences from the previous example lie in that the history recording module 312 may record a history of positioning executed by the electronic apparatus, such that the setting module 310 is able to search for a plurality of places appeared in the history, and performs relative statistics calculation for those places. The calendar module 314 stores a calendar, such that the setting module is able to search for a plurality of places appeared in the events recorded in the calendar and set as the places frequently visited by the user. The input module 316 may receive at least one place manually input by a user. The traffic information retrieving module 350 may retrieve real-time traffic information of the roads.

Figure 4:
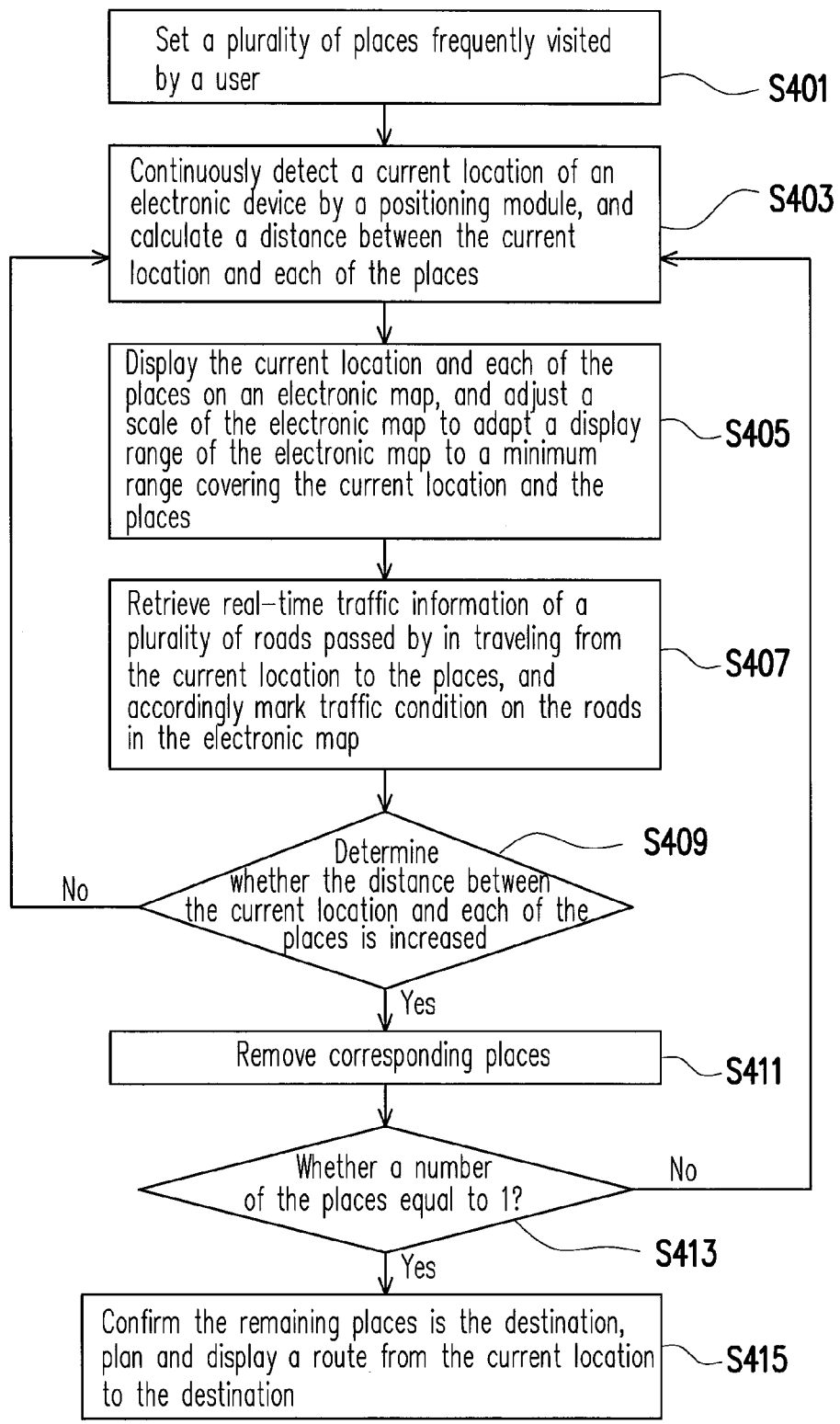
FIG. 4 is a flowchart illustrating a method for estimating and displaying a destination according to one example of the application.

FIG. 4 is a flowchart illustrating a method for estimating and displaying a destination according to one example of the application. FIG. 5A to FIG. 5D are schematic diagrams illustrating situations of the apparatus 300 being used. The method of the present example is adapted to the aforesaid apparatus 300, and a detailed flow of the method for estimating and displaying the destination of the present example is described accompanied with each element in the apparatus 300 and the schematic diagrams of FIG. 5A to FIG. 5D.

First, referring to FIG. 4, the setting module 310 sets a plurality of places frequently visited by a user (step S401). In one example, the places may be from a history of positioning executed by the electronic apparatus and recorded by the history recording module 312, in which the aforesaid places comprise the places that have been set as the destinations of navigation, places that the electronic apparatus connects with a vehicle and/or separates from the vehicle which represents the places that the user gets on and/or off the vehicle, or some places that the user usually visits without using navigation, such as home, work place, school, fitness center, or supermarket. Those places may be obtained from the record of the positioning locations continuously positioning or the positioning locations which are positioning many times by the positioning module of the electronic apparatus, which are not limited herein. The setting module 310 may search for a plurality of places appeared in the record, and accumulate an appearance number of times of each place, so as to set the places having the appearance number of times sorted ahead as the places frequently visited by the user. For example, the places having higher appearance number of times may be the places where the user usually visits in the daily life such as user's home, work place, school, fitness center, or supermarket.

In another example, the aforesaid places may be the places appeared in the calendar stored by the calendar module 314. The setting module 310 may search for a plurality of places appeared in the events recorded in the calendar through the calendar module 314, and accumulate an appearance number of times of each place, so as to set the places having the appearance number of times sorted ahead as the places frequently visited by the user. For example, the locations of the events recorded by the calendar module 314 may be the places regularly visited by the user, such as an inspection or a return diagnosis in the hospital, or a weekly yoga class. The setting module 310 may accumulate an appearance number of times of each place, and accordingly determine the places frequently visited by the user. In another example, the setting module 310 may execute the statistics day by day. In yet another example, the setting module 310 may add the places of to-do tasks within a preset time period, such as the places of to-do tasks in the present day, to the estimated places. In addition, the setting module 310 may obtain the places from the tasks, messages, or e-mails stored in the electronic apparatus, or from a social network or other data resources. According to the date of the recorded places, the setting module 310 may add the places in the day that the user uses the electronic apparatus to the estimated places.

Besides the aforesaid method for setting places through the history or the calendar, in another example, the aforesaid places may be the places manually input by the user. In detail, when the input 316 receives the places from the input operation of the user, the setting module 310 sets the input places as the places frequently visited by the user.

Then, the calculation module 320 detects a current location of the electronic apparatus by using a positioning module (not shown), and calculates a distance between the current location and each of the places (step S403). Similar to step S203, the positioning module may be GPS, which can process satellite positioning signals so as to obtain longitude and latitude coordinates of the current location. The calculation module 320 may calculate the distance between the current location and each of the places by using the longitude and latitude coordinates thereof.

After the distance between the current location and each of the places is obtained, the calculation module 320 may calculate a moving speed of the electronic apparatus and estimate the time required in traveling from the current location to each of the places according to the moving speed. The moving speed may be obtained according to a vehicle speed, and then used to calculate the time required to reach the corresponding place. In addition, the estimated time may be obtained according to a maximum speed limit or an average vehicle moving speed by existing algorithms.

Figures 5A, 5B:
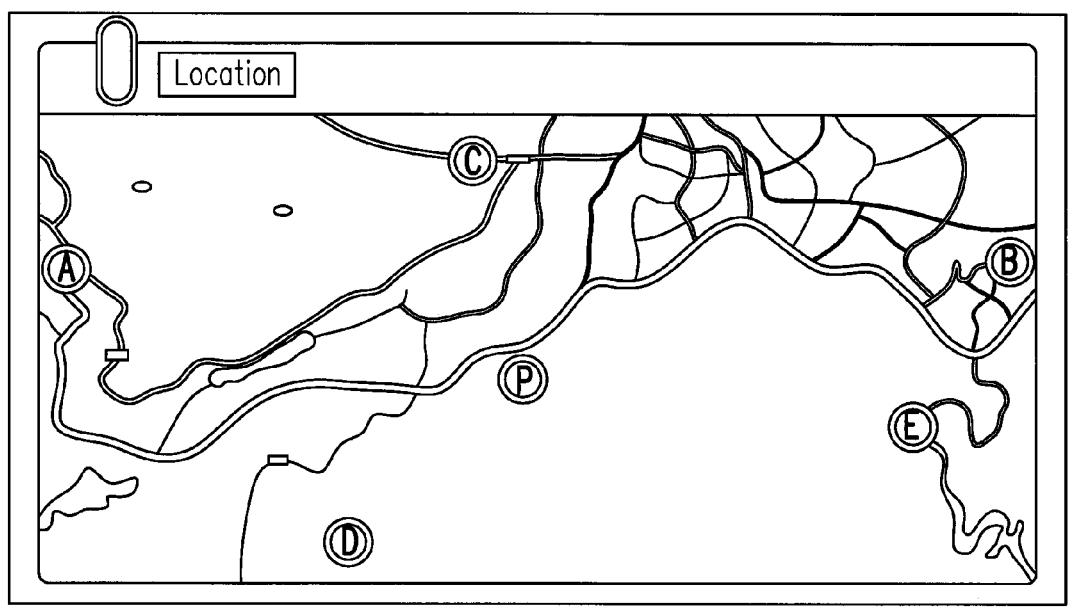
FIG. 5A to FIG. 5D are schematic diagrams illustrating situations of the electronic apparatus 300 being used.
Figure 5C:
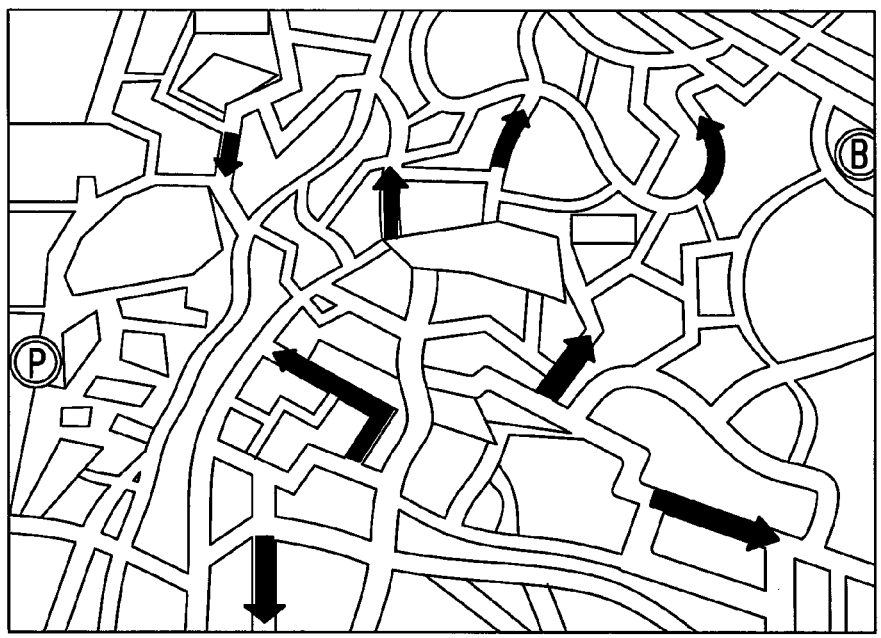

After the distance between the current location and each of the places and the required time are obtained, the estimation module 340 may display a frame as shown in FIG. 5A. Referring to FIG. 5A, the frame 500A shows five places 510, distances 520 between those places 510 and the current location, and the time 530 estimated to arrive at the places. Take the work place as an example, the distance between the work place and the current location is 11 kilometer, and the estimated time of arrival is 8:13 AM. Besides, the content displayed in the frame 500 is not limited to the distance and the time, in another example, the frame 500 may show information about the places such as weather condition.

It is noted herein that the destination estimating and display apparatus 300 may further integrate with an electronic map to display the current location and each of the places on the electronic map, and adjust a scale of the electronic map, so as to adapt an display range of the electronic map to cover the current location and the places (step S405), for example, a minimum range that can covers the current location and the places. For example, referring to FIG. 5B, the electronic map 500B comprises places A, B, C, D, E, and P, which respectively represent home, work place, school, fitness center, yoga class, and the current location. At this time, in order to simultaneously display all of the places A, B, C, D, E, and P, a scale of the electronic map 500B is very possible to be reduced.

In addition, the destination estimating and display apparatus 300 may communicate with a traffic control center so as to obtain real-time traffic information. In detail, the traffic information retrieving module 350 may retrieve real-time traffic information of a plurality of roads passed by in traveling from the current location to each of the places, and accordingly marks traffic condition on the roads in the electronic map (step S407). For example, referring to FIG. 5C, the estimation module 340 may mark traffic condition of each road on the electronic map 500C, for example, mark jammed levels of traffic or jammed roads. Further, the estimation module 340 may mark the reasons resulting in the traffic jam, such as car accident, road construction, or high vehicle density, or mark advanced road information such as delay time or length of jammed road.

As the electronic apparatus moves, the positioning module continuously detects the current location, the calculation module 320 continuously calculates the distance between the current location and each of the places, and the determination module 330 determines whether the distance between the current location and each of the places increases within a preset time (step S409), so as to remove the place. The determination module 330 may determine whether an amount of distance increased before and after a preset time period is over a threshold, so as to remove the place. The technical detail may refer to the description of step S205 and is not repeated herein.

When the distance is not increased within the preset time, or the increment of distance is smaller than the threshold, the flow returns to step S403 for continuous detection. When the distance is increased in the preset time and the increment of distance is over the threshold, the estimation module 340 removes corresponding places from the electronic map (step S411). For example, the estimation module 340 may dynamically enlarge the scale of the electronic map to reduce the display range of the electronic map, so as to gradually remove the places with increased distance. That is to say the places being removed are the places that the user least visits and therefore are no longer being considered. Meanwhile, the increase of the scale of the electronic map may make the information displayed on the electronic map larger and clearer, so as to make the user easily view the desired information.

Figure 5D:
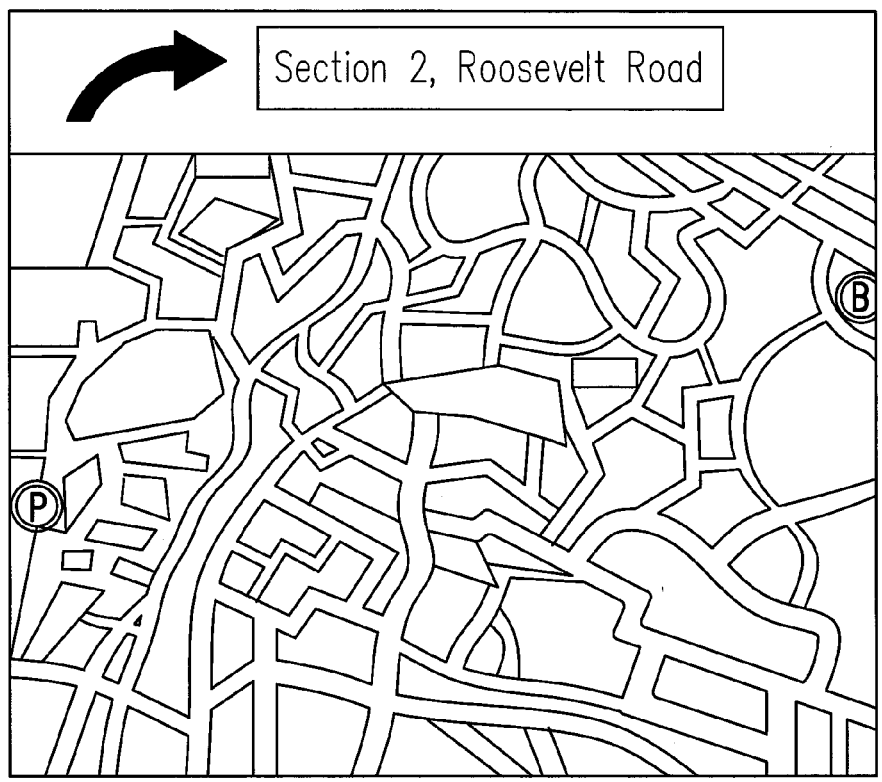

Regarding the remaining places, the estimation module 340 determines whether a number of the remaining places is equal to one (step S413). In the present example, if the number of remaining places is not equal to one, the flow returns to steps S403 for continuous location detection, so as to dynamically adjust the scale of the electronic map to remove the place according to the remaining places. In an example, when only one place is left on the electronic map, the estimation module 340 may confirm the place as the destination where the user intends to go, and accordingly plans and displays a route from the current location to the destination (step S415). For instance, FIG. 5D is a schematic diagram of an electronic map having only one remaining place. The display range of the electronic map 500D is, for example, a minimum range covering the current location P and the remaining place B. The plan of route may be combined with existing navigation system, and may also be accompanied with aforesaid traffic information retrieved by the traffic information retrieving module 350, which is not limited herein.

The application further provides a recording medium (i.e., a compact disc, a disc, and a removable disc, etc.) that records a computer-readable program so as to execute the aforementioned method for estimating and displaying the destination. Here, the program stored in the recording medium is generally composed of a plurality of code segments (i.e., an organization chart establishing program segment, an approval form program segment, a setting program segment, and a deployment program segment). Furthermore, a function of the code segments corresponds to the steps of the aforementioned method and the function block diagram of the apparatus described above.

In summary, in the method, the apparatus, and the recording medium for estimate and display the destination of the present application, the distance between a current location of the electronic apparatus and a plurality of places is continuously detected, so as to automatically estimate the destination the user intends to leave for. Besides, by combining the electronic map, the real-time traffic information, and the navigation system, the application may display an electronic map in traveling from the current location to each of the estimated destinations, and mark the real-time traffic information on the roads between the current location and the places. Accordingly, the application may assist the user in fast and efficiently reach the destination. In the overall flow, the user does not have to perform miscellaneous operations, and the electronic apparatus may know the destination that the user intends to go, and accordingly usage experience can be improved.

Although the application has been described with reference to the above examples, it will be apparent to one of ordinary skill in the art that modifications to the described examples may be made without departing from the spirit of the application. Accordingly, the scope of the application will be defined by the attached claims and not by the above detailed descriptions.

What is claimed is:

1. A method for estimating and displaying a destination, adapted for an electronic apparatus to estimate the destination the user intends to go, comprising:
   setting by a setting module a plurality of first places comprising a first possible place, a second possible place, and a third possible place frequently visited by a user;
   continuously detecting by a positioning module a current location of the electronic apparatus by using a positioning module, and calculating a first distance between the current location and the first possible place, a second distance between the current location and the second possible place, and a third distance between the current location and the third possible place;

determining by a determination module whether the first distance, the second distance, and the third distance increase;

adjusting by an estimation module a scale of an electronic map to generate a first reduced electronic map by removing the first possible place from the electronic map to display the second possible place and the third possible place in response to determining that the first distance increases, the second distance and the third distance do not increase, wherein a display range of the first reduced electronic map is less than that of the electronic map and is adapted to cover the current location, the second possible place, and the third possible place; and adjusting by an estimation module a scale of the first reduced electronic map to generate a second reduced electronic map by removing the second possible place from the first reduced electronic map to set and display the third possible place as an estimated destination in response to determining that the second distance increases and the third distance does not increase, wherein a display range of the second reduced electronic map is less than that of the first reduced electronic map and is adapted to cover the current location and the third possible place; retrieving, by a traffic information retrieving module, a real-time traffic information of a plurality of roads passed by in traveling from the current location to each of the first places;

marking, by the estimation module, a traffic condition of each of the roads on the electronic map according to the real-time traffic information; and displaying, by a display apparatus, the distance between the current location and each of the first places and the time required in traveling to each of the first places, wherein the display range of the first reduced electronic map is a minimum range covering the current location, the second possible place, and the third possible place.

2. The method according to claim 1, wherein the step of determining whether the first distance, the second distance, and the third distance increase comprises:

determining whether the distance between the current location and each of the first possible place, the second possible place, and the third possible place increases within a preset time period.

3. The method according to claim 1, wherein the step of setting the first places comprising the first possible place, the second possible place, and the third possible place frequently visited by the user comprises:

retrieving a history of positioning executed by the electronic apparatus to search for a plurality of second places appeared in the history; and accumulating an appearance number of times of each of the second places, so as to set the second places having the appearance number of times sorted ahead as the first places frequently visited by the user.

4. The method according to claim 1, wherein the step of setting the first places comprising the first possible place, the second possible place, and the third possible place frequently visited by the user comprises:

accessing a calendar stored in the electronic apparatus to search for a plurality of third places appeared in a plurality of events recorded in the calendar; and accumulating an appearance number of times of each of the third places, so as to set the third places having the appearance number of times sorted ahead as the first places frequently visited by the user.

5. The method according to claim 1, wherein the step of determining whether first distance, the second distance, and the third distance increase comprises:

determining whether an increment of the distance between the current location and each of the first possible place, the second possible place, and the third possible place is over a threshold.

6. The method according to claim 1, further comprising:

calculating a moving speed of the electronic apparatus; and estimating a time required in traveling from the current location to each of the first places according to the moving speed.

7. The method according to claim 1, wherein the display range of the second reduced electronic map is a minimum range covering the current location and the third possible place.

8. An apparatus for estimating and displaying a destination, adapted to estimate the destination the user intends to go, comprising:

a setting module, configured to set a plurality of first places comprising a first possible place, a second possible place, and a third possible place frequently visited by a user;

a calculation module, configured to continuously detect a current location of the electronic apparatus by using a positioning module, and calculate a first distance between the current location and the first possible place, a second distance between the current location and the second possible place, and a third distance between the current location and the third possible place;

a determination module, configured to determine whether first distance, the second distance, and the third distance increase; and an estimation module, configured to adjust a scale of an electronic map to generate a first reduced electronic map by removing the first possible place from the electronic map to display the second possible place and the third possible place in response to determining that the first distance increases, the second distance and the third distance do not increase, and to adjust a scale of the first reduced electronic map to generate a second reduced electronic map by removing the second possible place from the first reduced electronic map to set and display the third possible place as an estimated destination in response to determining that the second distance increases and the third distance does not increase, wherein a display range of the first reduced electronic map is less than that of the electronic map and is adapted to cover the current location, the second possible place, and the third possible place, and wherein a display range of the second reduced electronic map is less than that of the first reduced electronic map and is adapted to cover the current location and the third possible place; a traffic information retrieving module, configured to retrieve a real-time traffic information of a plurality of roads passed by in traveling from the current location to each of the first places, and accordingly mark a traffic condition on the roads in the electronic map; and a display apparatus, configured to display the distance between the current location and each of the first places and the time required in traveling to each of the first places, wherein the display range of the first reduced electronic map is a minimum range covering the current location, the second possible place, and the third possible place.

9. The apparatus according to claim 8, wherein
the determination module determines whether the distance between the current location and each of first possible place, the second possible place, and the third possible place increases within a preset time.

10. The apparatus according to claim 8, further comprising:
a history recording module, configured to record a history of positioning executed by the electronic apparatus, wherein the setting module searches for a plurality of second places appeared in the history, and accumulates an appearance number of times of each of the second places, so as to set the second places having the appearance number of times sorted ahead as the first places frequently visited by the user.

11. The apparatus according to claim 8, further comprising:
a calendar module, configured to store a calendar, wherein the setting module searches for a plurality of third places appeared in a plurality of events recorded in the calendar and sets the same as the first places frequently visited by the user.

12. The apparatus according to claim 8, further comprising:
an input module, configured to receive at least one fourth place manually input by a user, wherein the setting module sets the at least one fourth place as the first places frequently visited by the user.

13. The apparatus according to claim 8, wherein
the determination module determines whether an increment of the distance between the current location and each of the first possible place, the second possible place, and the third possible place is over a threshold.

14. The apparatus according to claim 8, wherein
the calculation module further calculates a moving speed of the electronic apparatus and estimates a time required in traveling from the current location to each of the first places according to the moving speed; and
the estimation module further displays the distance between the current location and each of the first places and the time required in traveling to each of the first places.

15. The apparatus according to claim 8, wherein the display range of the second reduced electronic map is a minimum range covering the current location and the third possible place.

16. The apparatus according to claim 8, wherein when the third place is the only first place is left after removal, the estimation module confirms the third place as a destination, and accordingly plans and displays a route from the current location to the destination.

17. A non-transitory computer-readable recording medium, configured to store a computer program, which is loaded in an electronic apparatus to execute following steps:
setting by a setting module a plurality of first places comprising a first possible place, a second possible place, and a third possible place frequently visited by a user;
continuously detecting by a positioning module a current location of the electronic apparatus by using a positioning module, and calculating a first distance between the current location and the first possible place, a second distance between the current location and the second possible place, and a third distance between the current location and the third possible place;
determining by a determination module whether the first distance, the second distance, and the third distance increase;
adjusting by an estimation module a scale of an electronic map to generate a first reduced electronic map by removing the first place from the electronic map to display the second possible place and the third possible place in response to determining that the first distance increases, the second distance and the third distance do not increase, wherein a display range of the first reduced electronic map is less than that of the electronic map and is adapted to cover the current location, the second possible place, and the third possible place; and
adjusting by an estimation module the scale of the first reduced electronic map to generate a second reduced electronic map by removing the second possible place from the first reduced electronic map to set and display the third possible place as a destination in response to determining that the second distance increases and the third distance does not increase, wherein a display range of the second reduced electronic map is less than that of the first reduced electronic map and is adapted to cover the current location and the third possible place; retrieving, by a traffic information retrieving module, a real-time traffic information of a plurality of roads passed by in traveling from the current location to each of the first places;
marking, by the estimation module, a traffic condition of each of the roads on the electronic map according to the real-time traffic information; and
displaying, by a display apparatus, the distance between the current location and each of the first places and the time required in traveling to each of the first places, wherein the display range of the first reduced electronic map is a minimum range covering the current location, the second possible place, and the third possible place.

* * * * *